US005165941A

United States Patent [19]

Hawley

[11] Patent Number: 5,165,941
[45] Date of Patent: Nov. 24, 1992

[54] EXTRUDER APPARATUS AND PROCESS FOR COMPOUNDING THERMOPLASTIC RESIN AND FIBRES

[75] Inventor: Ronald C. Hawley, Winona, Minn.

[73] Assignee: Composite Products, Inc., Winona, Minn.

[21] Appl. No.: 728,700

[22] Filed: Jul. 11, 1991

Related U.S. Application Data

[63] Continuation of Ser. No. 402,237, Sep. 5, 1989, abandoned.

[51] Int. Cl.⁵ .................... B29C 47/00; B29C 47/10
[52] U.S. Cl. ............................ 425/148; 264/171;
264/211.23; 264/349; 425/205; 425/327;
425/376.1; 425/377
[58] Field of Search ............. 264/171, 265, 271.1,
264/279, 174, 211, 211.23, 349; 425/110, 113,
114, 130, 131.1, 145, 148, 324.1, 200, 204, 205,
207–209, 325, 327, 376.1, 377, 382.4, DIG. 39

[56] References Cited

U.S. PATENT DOCUMENTS

| | | | |
|---|---|---|---|
| 3,304,282 | 2/1967 | Cadus et al. | 264/349 |
| 3,409,711 | 11/1968 | Pashak et al. | 264/211.23 |
| 3,453,356 | 7/1969 | Kent, Jr. et al. | 264/211.23 |
| 3,520,027 | 7/1970 | Amos et al. | 425/130 |
| 3,632,254 | 1/1972 | Woodham et al. | 425/208 |
| 3,746,489 | 7/1973 | Rizzi et al. | 425/204 |
| 4,077,753 | 3/1978 | Tanaka | 425/131.1 |
| 4,115,509 | 9/1978 | Kendall-Smith et al. | 264/349 |
| 4,209,476 | 6/1980 | Harris | 425/145 |
| 4,393,020 | 7/1983 | Li et al. | 264/108 |
| 4,436,685 | 3/1984 | Emura et al. | 425/324.1 |
| 4,476,175 | 10/1984 | Forry et al. | 264/510 |
| 4,500,595 | 2/1985 | Gerteisen et al. | 156/181 |
| 4,616,989 | 10/1986 | Mewes et al. | 425/208 |
| 4,663,103 | 5/1987 | McCullough et al. | 264/349 |
| 4,848,915 | 7/1989 | Fintel | 425/145 |
| 4,883,624 | 11/1989 | Spaay | 425/297 |
| 4,927,579 | 5/1990 | Moore | 264/349 |
| 4,976,904 | 12/1990 | Bilhorn | 425/204 |

*Primary Examiner*—Jay H. Woo
*Assistant Examiner*—James P. Mackey
*Attorney, Agent, or Firm*—Moore & Hansen

[57] ABSTRACT

Multiple extruder apparatus for compounding thermoplastic resin and reinforcing fibers incorporates a resin extruder in which thermoplastic resin pellets are melted and a compounding extruder in which the molten thermoplastic resin is mixed in intimate contact with long reinforcing fibers of at least one inch in length. The melted thermoplastic resin is introduced into the compounding extruder at a point downstream of the inlet point for the reinforcing fibers, so that the fibers are mechanically worked and heated before coming into contact with heated, molten thermoplastic resin.

The extrudate from the compounding extruder consists of a homogeneous, molten mass of thermoplastic resin having discrete lengths of fibers randomly dispersed therein.

13 Claims, 2 Drawing Sheets

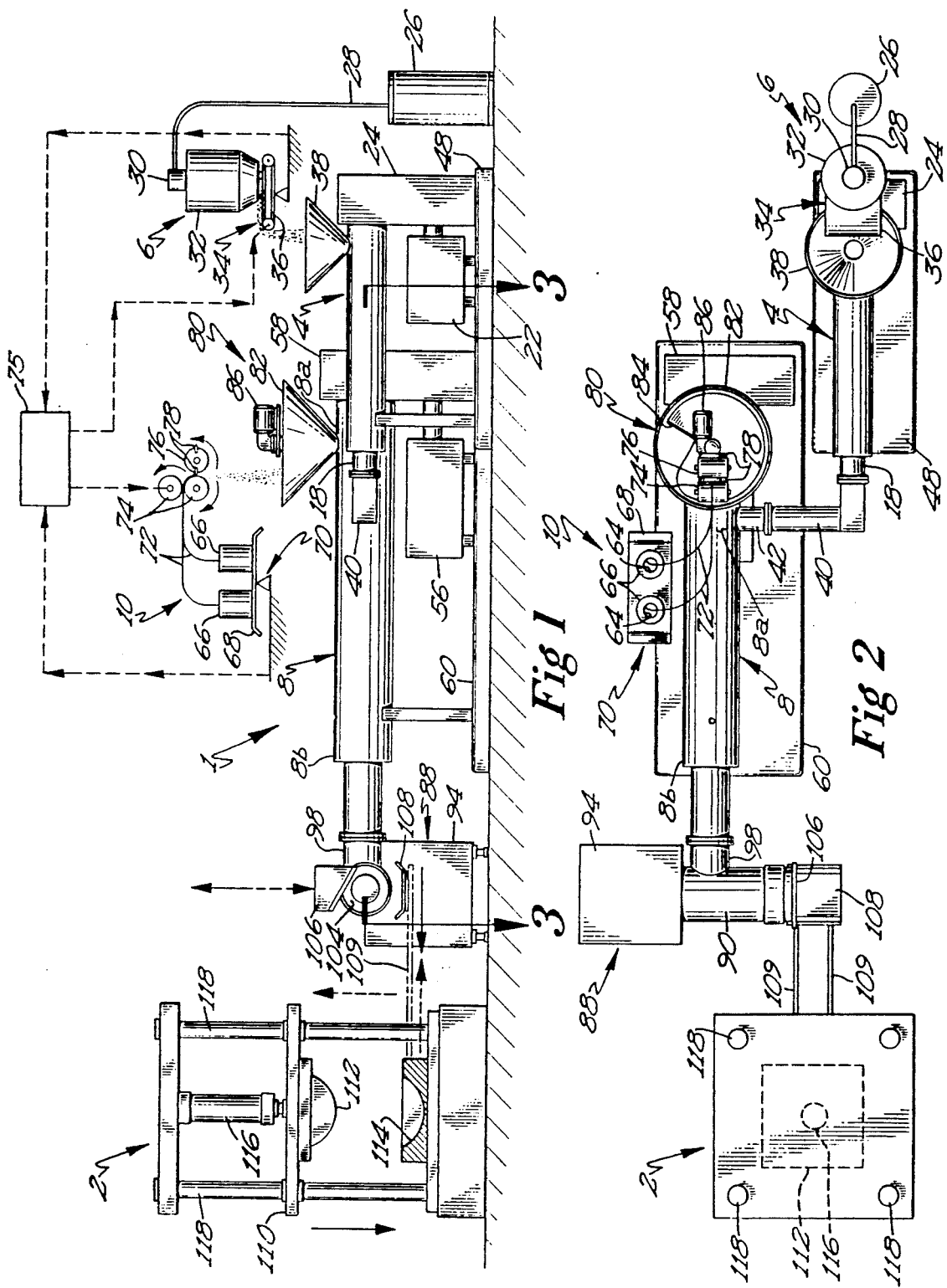

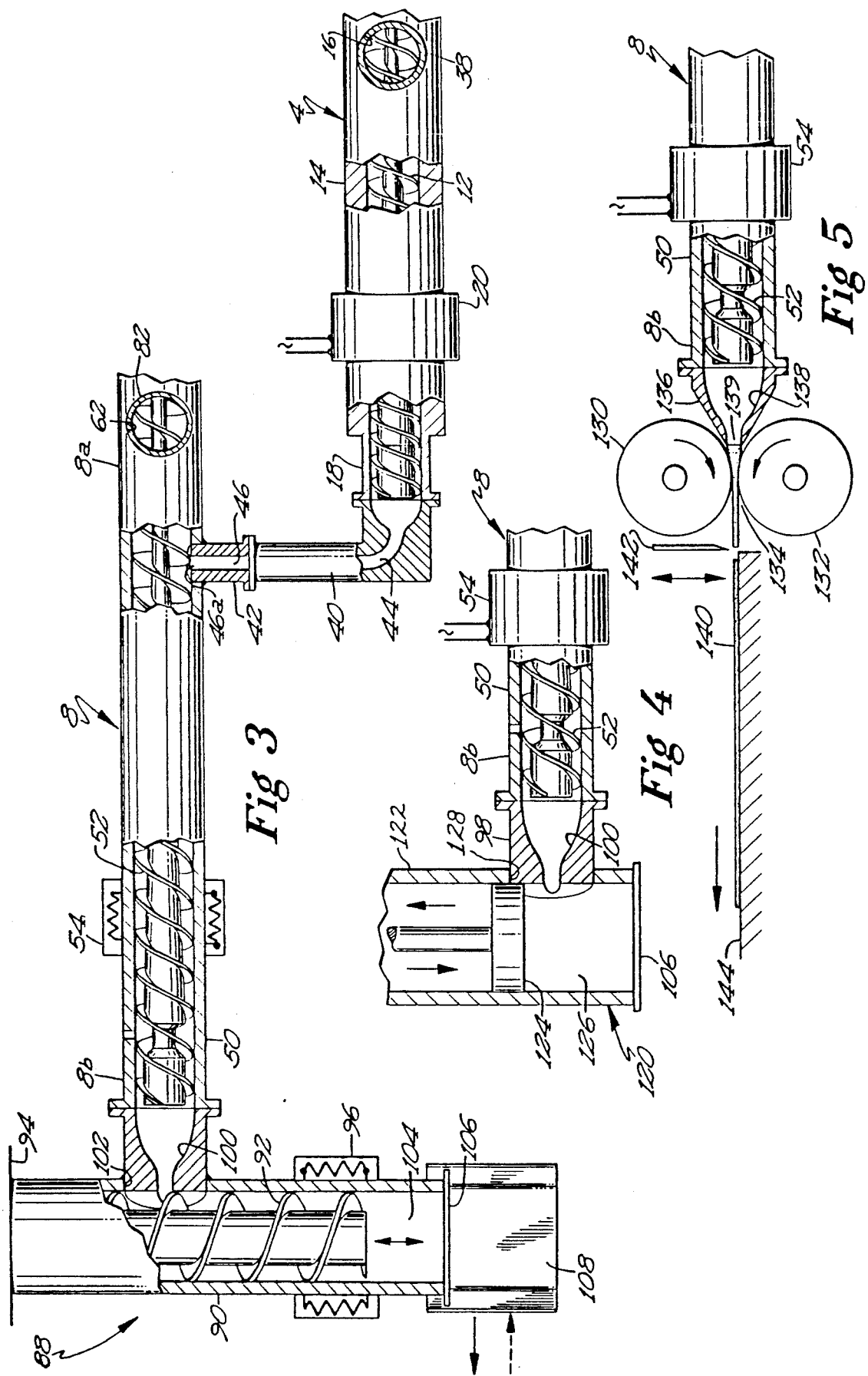

EXTRUDER APPARATUS AND PROCESS FOR COMPOUNDING THERMOPLASTIC RESIN AND FIBRES

This is a continuation of application Ser. No. 07,402,237, filed Sept. 5, 1989, now abandoned.

BACKGROUND OF THE INVENTION

This invention relates generally to extrusion compounding of thermoplastic resin with reinforcing fibers. More particularly, a multiple extruder apparatus and process for producing a preform suitable for subsequent use in a molding operation, such as compression molding, is disclosed.

Compounding of both thermoplastic and thermosetting resins with reinforcing fibers in an extruder is known in the prior art. However, the prior art compounding apparatus and processes present problems and disadvantages which are overcome by the particular, multiple extruder system disclosed herein.

In the known prior art compounding procedures, the fibers and resins are normally introduced together into a compounding extruder in a solid state. In such a compounding operation, the fibers are broken down into very short lengths, usually less than 0.10 inches, due to both the mechanical action of the extruder screw on the fibers, and the presence of thermoplastic resins in a high viscosity state when the resin begins to melt. The fibers are thus present in the extruder when the thermoplastic resin is being initially transformed from a solid to a liquid state. Upon first being converted from a solid to a liquid by a combination of mechanical working and heat, thermoplastic resins have a relatively high viscosity, which contributes to fiber breakage as the resins are intermixed with the fibers in the extruder. U.S. Pat. No. 4,422,922 discloses such a compounding extruder apparatus and process. According to the disclosure of that patent, a single, twin screw extruder is utilized for both initially melting the polymer and for blending or compounding carbon fibers with the melted polymer. In a first disclosed procedure, the polymer and reinforcing fibers are both introduced into the extruder together at a supply hopper. In a second embodiment of that patent, a thermoplastic resin polymer is introduced into a first extruder zone where it is melted, and from which it is fed into a second extruder zone where the fibers are introduced. This procedure has the disadvantage that the fibers are introduced downstream of the thermoplastic resin input point in the compounding extruder. Thus, relatively cold fibers draw heat out of the melted thermoplastic resin, thereby raising the viscosity of the resin. The resulting, somewhat more viscous thermoplastic resin contributes to fiber breakage during the extruding process. This procedure has further disadvantages. The screw speed desirable for melting the resin is not necessarily the screw speed which would be most effective for compounding resin and fibers. Also, the relative volumes of the resin and fibers must be closely controlled in order to achieve the desired composite product; and it is difficult to properly match the volumes of those two components when compounding in a single screw of specific geometry.

My U.S. Pat. No's Re. 32,772 and 4,312,917 disclose a method and apparatus respectively for making a composite consisting of reinforcing fibers embedded in a thermoplastic resin material. The fiber-reinforced composite is formed by passing extruded plastic resin through a stationary die into which continuous lengths of reinforcing fibers are introduced in the presence of the heated, molten thermoplastic resin. The continuous length fibers are pulled through the die, in which they pass over lobes and are impregnated with the molten thermoplastic resin to form an extruded, plastic member having a predetermined shape with fiber strands extending continuously, and longitudinally therein. The extruded plastic member may be cut into short, pellet-size lengths for use as a molding compound.

U.S. Pat. No's. 4,393,020 and 4,500,595 disclose methods for manufacturing a fiber-reinforced thermoplastic composite. However, both patents utilize conventional, batch processes for carrying out the step of forming the polymer-fiber composite wherein the fibers are drawn through or dipped in a bath of the molten, thermoplastic resin. In U.S. Pat. No. 4,393,020 a process is disclosed in which the fibers are preferably oriented in one direction in the resin-fiber composite, and in both patents, the composite may have relatively long fibers, and is used to mold end products, as by injection molding.

Compression molding has certain advantages over injection molding, one of which is the capability of producing molded parts with significantly longer reinforcing fibers. The presence of the long reinforcing fibers creates plastic parts with improved mechanical properties. The plastic raw materials utilized in compression molding vary from sheet to bulk molding compounds (a puttylike mixture) to pellets. The bulk molding compound (BMC) and the pellet products are usually first converted to a preform prior to molding, but not always. The preform may be any desired shape, such as a sheet or "log" type of member which is introduced into the chamber of the compression mold. The molding compounds are made up of at least two components, including a reinforcing fiber, such as glass or carbon, and a plastic resin. Various fillers and additives, as well as colorants may be utilized in the molding compound. The plastic resin can be either thermosetting (requiring heat and pressure to increase molecular weight to form a solid substance), or thermoplastic (high molecular weight resins that require heat for melting and cold for solidifying). The vast majority of the compression molded parts today are made with thermosetting resins. Thermoplastic resins have some significant advantages over thermosetting resins when used in the compression molding process. Faster molding cycles and greater toughness in the molded articles are two of them. Thermoplastics have only recently been applied to compression molding. Raw material suppliers offer thermoplastic products for compression molding in two forms, sheets and pellets.

Thermosetting bulk molding compounds (TS-BMC) are in the form of a puttylike substance. The product is divided into chunks suitable in size for the intended application. This can be done by hand or in a commercially available machine that automatically produces chunks (preforms) of the correct size. The preform is placed into an open mold heated to the desired temperature. The resin melts, flows, chemically chain extends and cross links to a solid. The mold is opened and the part is removed so that the cycle is ready to be repeated. The mold is normally heated to approximately 300°-350° F. Thermosetting pellets, granules, or powder can be weighed and poured into an open mold heated to approximately the same temperature.

The foregoing molding methods show the inherent disadvantages of compression molding with a thermosetting resin product. In the mold, the resin must first melt, then flow, and then increase in molecular weight to a point where the product is a solid at the mold temperature. The result is a long cycle time. This long cycle time is costly to both the molder and the end user. This inherent disadvantage makes molding with the use of thermoplastics particularly attractive. Thermoplastics need only be cooled in the mold, resulting in substantial increases in productivity.

Thermoplastic sheet molding compounds (TP-SMC) are cut to sizes suitable for the intended application. The sheet is placed in an oven, the resin is melted, and the melted sheet is placed in an open mold heated to approximately 100°-200° F. This temperature is significantly lower than the melting point of the thermoplastic resin. The mold is closed rapidly, causing the resin to flow, filling the mold cavity. The relatively cold temperature of the mold causes the resin to harden rapidly. The mold is opened and the part is removed, allowing the mold to be recycled. Two limitations as to this method include inconsistency in the sheet product, and the inability to modify the composite formulation.

The foregoing limitations are eliminated in thermoplastic bulk molding compounds (TP-BMC). This product is available in pellet form. The pellets are fed into a commercially available machine that melts the resin, mixes the product uniformly, and produces a precisely measured preform. This hot preform is then placed in the mold, pressed, cooled, and removed. The part-to-part consistency is controlled and additives can be added that will alter the formulation of the composite, as needed. This TP-BMC process is the newest form of compression molding. Although it eliminates the limitations of TP-SMC, it also creates several new process difficulties.

First of all, in order to produce high physical properties in the molded article, long reinforcing fibers must be present. These long fibers are produced by cutting the TP-BMC pellet to lengths of one to two inches, typically. These long pellets are hard, rigid rods that do not handle particularly well in automated equipment. As the long pellet enters the preformer, it is often cut by the extruder screw flight as it passes the feed opening, thereby reducing the desired fiber length. Secondly, the long pellets cannot be dried in conventional dryers. Only resins that are nonhygroscopic can be molded at this time in the TP-BMC process. Some hygroscopic resins would make excellent finished parts in compression molding. Further disadvantages are that the molder must pay the cost of compounding the long fiber product into pellet form, as purchased by the molder, and multiple heat histories on the molding pellets reduce the physical properties of the finished part.

The foregoing problems and difficulties associated with prior art compression molding techniques would be eliminated if the molder could compound the thermoplastic molding product in-house in specially designed equipment that is connected to the preform-making equipment. The concept of in-house compounding by the molder is not new. However, the procedure is utilized primarily in the compression molding of thermosetting plastics, i.e., TS-BMC. Such compounding is done in mixers unsuitable for thermoplastics. Some thermoplastic injection molders also compound short fiber pellets in-house.

Accordingly, this invention is directed to apparatus and process for compounding long fiber (one inch in length or greater) with a thermoplastic resin in an extrusion process. The molder carries out this procedure, after which the hot mixture is fed directly into the preform-making equipment and from there, directly into the compression mold, if desired.

BRIEF SUMMARY OF THE INVENTION

This invention has as its primary objective the compounding of thermoplastic resin with reinforcing fibers in a multiple extruder system in such a way as to produce measured preforms of a predetermined size and shape consisting of discontinuous lengths of reinforcing fibers randomly dispersed in thermoplastic resin.

A further objective is to provide a blended mixture of thermoplastic resin with reinforcing fibers wherein the structural integrity of the discrete fibers is maintained in lengths preferably of one inch or more.

These basic objectives are realized by utilizing two separate extruders comprising a first, resin extruder and a second, compounding extruder. Discrete, predetermined lengths of reinforcing fibers are introduced into a first inlet port of the compounding extruder from a suitable source of supply. Thermoplastic resin pellets introduced into the resin extruder by pellet-handling apparatus are heated and melted therein, and forced under pressure into a second inlet port of the compounding extruder. The action of the power screw of the compounding extruder produces as an extrudate a molten mass of thermoplastic resin having discrete, discontinuous lengths of reinforcing fibers randomly dispersed therein.

As a particularly advantageous feature, the aforesaid second inlet port on the compounding extruder for receiving heated, thermoplastic resin is located along the length of the power screw of the compounding extruder at a location downstream from the first inlet port, into which the reinforcing fibers are introduced, with respect to the direction of fiber and resin flow through the compounding extruder. As a result, the fibers will be heated and mechanically worked by the power screw of the compounding extruder before coming into mixing contact with the molten, thermoplastic resin. This enhances the penetration and coating of the fibers by the thermoplastic resin and reduces fiber degradation at the moment of contact, which would otherwise occur if the thermoplastic resin were in a more viscous state.

A further, particularly beneficial aspect of the compounding process and apparatus resides in the weight-controlled supply of thermoplastic resin and fibers to the compounding extruder. The aforesaid pellet-handling apparatus comprises weighing and conveying apparatus which is constructed and arranged to feed thermoplastic resin pellets into the resin extruder inlet at a predetermined rate weight. Moreover, the reinforcing fibers are also introduced from a supply source which is also weight-controlled in order to carefully monitor and control the weight rate at which the fibers are fed into the compounding extruder. Such a supply source may preferably comprise packages of continuous fiber strands from which the fibers are pulled and cut into desired, discrete lengths. The weight-controlled supply of the thermoplastic resin and reinforcing fibers can be preferably accomplished by loss-in-weight devices utilized in combination with the supply sources of the resin pellets and reinforcing fibers. By carefully controlling the raw material feeding system, the desired weight ratio of the blended mixture of thermoplastic resin and long reinforcing fibers can be achieved on a consistent basis.

The aforesaid apparatus and process is preferably utilized in a compression-molding process wherein the extrudate from the compounding extruder is fed directly into a preformer. The preformer produces a compression-molding preform of desired weight which may be directly conveyed to the molding cavity of a compression molding machine. Alternately, the compounding extrudate may be formed as sheets suitable for subsequent use as a molding material.

These and other objects and advantages of the invention will become readily apparent as the following description is read in conjunction with the accompanying drawings wherein like reference numerals have been used to designate like elements throughout the several views.

BRIEF DESCRIPTION OF THE DRAWINGS

FIG. 1 is a vertical, elevation view of the apparatus of this invention;

FIG. 2 is a top, plan view of the apparatus of FIG. 1;

FIG. 3 is a fragmentary, top plan view of a portion of the apparatus of FIG. 2, partially in section view;

FIG. 4 is a fragmentary, top plan view, partially in section, of a modified form of preformer in combination with the compounding extruder of FIGS. 1-3; and FIG. 5 is a fragmentary, side elevation view of a modified form of sheet preformer shown in combination with the compounding extruder of FIGS. 1-3.

DESCRIPTION OF THE PREFERRED EMBODIMENTS

With reference to FIGS. 1-3 of the drawings, reference numeral 1 generally indicates the extruding apparatus for compounding reinforcing fibers with a thermoplastic resin material. Such apparatus may be utilized in combination with a compression-molding machine as generally indicated by reference numeral 2. As is hereinafter set forth, a preform produced from the molten extrudate discharged from the extruding apparatus and comprising a mixture of thermoplastic resin with reinforcing fibers may be conveyed to the molding machine 2 for molding an article of desired size and shape.

The extrusion apparatus is comprised of a resin extruder 4, and a compounding extruder 8 connected together in fluid flow relationship in a particularly advantageous manner as hereinafter described. The resin extruder has connected to it a source of supply of thermoplastic resin material, generally indicated by reference numeral 6; and a source of supply of reinforcing fibers indicated by reference numeral 10 is connected to the compounding extruder.

The resin extruder 4 comprises an elongated, rotatable mechanical screw 12 contained within the barrel or housing 14 of resin extruder 4. Screw 12 extends lengthwise through barrel 14 between an inlet port 16 and an outlet connection 18, as is best shown in FIG. 3. As is also shown in FIG. 3, an electrical heater 20 may be utilized around the barrel 14 of extruder 4 to provide supplementary heat, in addition to that provided by the mechanical action of extruder screw 12, to assist in melting thermoplastic resin pellets introduced into extruder barrel 14 through inlet port 16.

As is indicated in FIG. 1, power screw 12 of extruder 4 may be driven by a motor 22, the output shaft of which may be connected to screw 12 by an appropriate power transmitting means 24, such as a belt drive in a conventional manner.

Thermoplastic resin is supplied to extruder 4, preferably in pellet form from a drum or container 26. Any of a variety of thermoplastic resin materials may be utilized, among which by way of example, are included polypropylene, polyethylene, various nylons, polycarbonate, styrene, styreneacrylonitrile, acrylonitrile butadiene styrene, pclysulfone, polyurethane, polyphenylenesulfide, acetal resins, polyesters, polyester elastomers, such as DuPont Hytrel brand, and various thermoplastic rubbers. A vacuum loader 30 is connected to resin-pellet container 26 by way of a vacuum pickup tube 28 and serves to draw resin pellets from container 26 through tube 28 and to convey them into a thermoplastic dryer 32. Dryer 32 is of conventional design, and serves to dry the thermoplastic resin pellets to a desired level before they are conveyed into resin extruder 4. The final conveying of the pellets into extruder 4 is accomplished by way of a feeder conveyer 36, for example, in belt form as shown, and comprising a part of a loss-in-weight feed scale assembly 34. Various types of pellet conveyors may be used, including augers. All of the aforesaid pellet supply apparatus comprises pellet-handling means for conveying thermoplastic resin pellets from supply drum 26 to extruder 4, the discharge of resin pellets from belt conveyor 36 being directed into a final supply hopper 38, as shown in FIGS. 1 and 2. The bottom, discharge end of hopper 38 is connected to inlet port 16 of extruder 4. The feeder/scale assembly 34 is initially programmed to deliver thermoplastic resin pellets at a desired weight rate of flow into resin extruder 4. The scale is computer controlled.

Resin extruder 4 is mounted on a base plate 48, and its outlet connection or fitting 18 is connected to an adapter conduit 40 as shown in FIGS. 2 and 3. Adapter conduit 40 is connected in fluid-flow communication between outlet connection 18 on the discharge end of resin extruder 4 and an inlet fitting 42 provided on compounding extruder 8 on inlet end section 8a. An internal flow passage 44 within adapter conduit 40 is positioned to receive the extrudate discharged through outlet connection 18 of extruder 4. A similar, internal flow passage 46 within inlet fitting 42 communicates with flow passage 44 of adapter conduit 40 and has a discharge end 46a which serves as an inlet port to the inlet end 8a of compounding extruder 8.

The mechanical action, including friction, generated by power screw 12 of resin extruder 4 on the thermoplastic resin pellets, coupled with the heat from supplemental heater 20, serves to melt the thermoplastic resin pellets within the barrel 14 of extruder 4. The thermoplastic resin thus leaves extruder 4 through its outlet connection 18 in the form of a molten mass in a fluid state, and is conveyed under the pumping action of extruder screw 12 through adapter conduit 40 into compounding extruder 8 through inlet port 46a.

Compounding extruder 8 has a barrel or housing 50 within which is contained an elongated, power screw 52 extending from inlet end 8a to outlet or discharge end 8b of extruder 8. A supplemental electric heater 54 may also be utilized as shown in FIG. 3 in embracing relation to the housing of compounding extruder 8.

Compounding extruder 8 is supported on a base pad or plate 60, which also carries a drive motor 56 and power transmitting means 58 for providing rotary power to extruder screw 52 of compounding extruder 8. As with resin extruder 4, the power transmitting means 58 is contained within a housing as shown, and is connected to the output shaft of drive motor 56. Such a power-transmitting means may take various forms, including that of a conventional belt drive.

Compounding extruder 8 has a first inlet port 62 on inlet end 8a, which is positioned upstream of molten resin inlet port 46a with respect to the direction of material flow through extruder 8, for reasons hereinafter set forth.

The source of supply 10 of reinforcing fibers is connected to first inlet port 62. The source of supply of reinforcing fibers may take various forms. It is only essential that the reinforcing fibers be supplied to compounding extruder 8 as discrete lengths of reinforcing fibers of a predetermined length, preferably in excess of one inch at a controlled rate. For that purpose, the supply source of reinforcing fibers may preferably comprise a pair of rolls 64 held within a pair of dispensing containers or packages 66 as shown in Figs. 1 and 2. The fiber supply rolls 64 and their container 66 are positioned on a base plate 68 forming a component of a loss-in-weight scale 70 indicated in FIG. I. Continuous lengths of reinforcing fibers 72 drawn from rolls 64 are guided between a pair of friction rollers 74 which serve to pull continuous lengths of fibers from supply rolls 64. A cut-off roller 76 is provided with a plurality of cut off blades 78. These blades serve to sever the continuous strands of fiber 72 at predetermined intervals, so as to cut the reinforcing fiber to discrete, predetermined lengths. The separate, discrete lengths of reinforcing fibers are directed into hopper 82 of a cram feeder 80 having a feed auger 84. As shown in FIGS. 1 and 2, feed auger 84 is driven by a drive motor 86 having a gear reduction unit. Rotating auger 84 serves to cram or force-feed the discrete lengths of reinforcing fibers through first inlet port 62 into the inlet end 8a of compounding extruder 8.

As with the loss-in-weight scale 34 utilized for the introduction of resin pellets into extruder 4, loss-in-weight scale 70 is computer programmed so as to permit the feeding of reinforcing fibers at a desired weight rate through cram feeder 80 into inlet port 62 of compounding extruder 8. To that end, the rotational speed of fiber feed rollers 74 is controlled by signals received from the loss-in-weight scale 70. In this way, rollers 74 rotate at a predetermined speed so as to pull continuous fiber strands 72 from supply packages 66 at a desired speed for cutting into discrete lengths by blades 78. A computer 75 is shown schematically in FIG. 1 for receiving weight feed signals from scales 34 and 70 and delivering feed control signals to regulate the speed of conveyor 36 as well as the speed of feed rollers 74. Computer 75 is initially programmed to provide the predetermined formulation of resin and fiber, e.g., 60% resin and 40% fiber by weight in the extrudate, as well as to control the desired total weight input of fiber and resin in pounds per time interval.

Within compounding extruder 8, the molten thermoplastic resin and the discrete lengths of reinforcing fibers are mixed and compounded intimately in order to form a homogeneous mass. The molten mass of thermoplastic resin having discrete, discontinuous lengths of reinforcing fibers randomly dispersed therein is formed in the barrel 50 of compounding extruder 8 by the mechanical action of power screw 52 and pumped to the discharge end 8b of extruder 8 by screw 52 as extrudate. The fibers within the molten extrudate discharged from compounding extruder 8 are preferably of a length greater than one inch, to thus provide maximum mechanical strength enhancement to articles which are molded from such extrudate. The extrudate discharged from output end 8b of extruder 8 may preferably be directed into a preforming device for forming the molten mixture of thermoplastic resin and reinforcing fibers into a predetermined size and shape to be used as a preform in a molding machine.

Particular advantages and benefits are realized by locating the inlet port 46a for the introduction of molten thermoplastic resin into compounding extruder 8 at a location along the length of power screw 52 which is downstream from the first inlet port 62 through which reinforcing fibers are received. The term downstream refers to the direction of fiber and molten thermoplastic resin flow through compounding extruder 8 from its inlet end 8a to its discharge end 8b. As a result of this particular input arrangement for the molten mass of thermoplastic resin and the precut lengths of reinforcing fibers, the fibers will be heated and mechanically worked by power screw 52 along the inlet end 8a of extruder 8 before coming into mixing contact with the molten thermoplastic resin. As a result, the penetration and coating of the individual filaments making up the strands or bundles of each length of fiber will be greatly enhanced. Also, since the fibers will have been preheated along the inlet end of compounding extruder 8, they will not cool the heated thermoplastic resin and increase its viscosity. The higher the viscosity of the thermoplastic resin, the greater the propensity for degradation and breaking up of the reinforcing fibers at the moment of contact. It is to be noted that the thermoplastic resin is introduced as a molten mass from resin extruder 4 into compounding extruder 8 through port 46a at an elevated temperature which may be in a range generally between 400° F. and 700° F., depending upon the particular thermoplastic resin utilized.

As noted above, the extrudate mixture of molten thermoplastic resin and discrete lengths of reinforcing fibers discharged from compounding extruder 8 may be directed into a preforming device, such a device being indicated generally by reference numeral 88 in FIGS. 1, 2, and 3.

The preforming device may take various forms, depending upon the particular type and shape of preform desired for a molding operation. If a log or billet-shaped preform is desired, of generally cylindrical shape, an extruding preformer comprised of a barrel or housing 90 and having a power screw 92 may be utilized. Such an extruder is provided with a drive unit 94 comprising a motor and a power transmission means for providing rotary power to screw 92 as well as reciprocal movement. An external heater 96 may also be utilized around the outside of preform extruder housing 90. An adapter fitting 98 formed with a converging internal passage 100, is preferably utilized to force the homogeneous mixture of molten thermoplastic resin and long, chopped reinforcing fibers into a side port 102 of preformer extruder housing 90. Adapter 98 is connected as shown between the outlet or discharge end 8b of barrel 50 of compounding extruder 8 and side port 102 of preformer extruder housing 90. At the discharge end of extruder barrel 90, a preform chamber 104 is provided. Preferably, extruder screw 92 not only rotates, but is provided with a drive arrangement which reciprocates it back and forth along the length of extruder barrel 90, a indicated by the directional arrows in FIG. 3. A cut off knife 106 is provided across the discharge end of extruder housing 90. In operation, the rotational movement of extruder screw 92 forces molten extrudate received through adapter fitting internal passage 100 into preform chamber 104 to form a log or billet-shaped preform against the cut off knife 106. Cut off knife 106 is then raised vertically, and power screw 92 reciprocates forwardly towards preform chamber 104 so as to force a billet-shaped preform out onto a shuttle plate 108. Knife 106 is then actuated to move downwardly and cut off the preform billet to the desired length. The rotation of screw 92 causes a pressure build-up within chamber 104, in response to which screw 92 then reciprocates rearwardly to receive another charge of molten, preform extrudate from the discharge end of compounding extruder 8. Shuttle plate 108 may be arranged to reciprocate laterally back and forth on conveyor means generally indicated by reference numeral 109 in FIGS. 1 and 2. Such an arrangement is used where it is desired to provide the compounding apparatus and the preformer in direct association with a molding machine indicated by reference numeral 2 for direct, combined operation by a molder. The molding machine 2 indicated generally in FIGS. 1 and 2 is a compression molding machine comprised of a compression press 110 carrying a male mold-head 112 adapted to be received within a molding cavity 114. Compression press 110 is reciprocated upwardly and downwardly on guide rods 118 by a reciprocating power cylinder 116.

Thus, the preform molding material comprised of a log or billet received from preformer 88 on shuttle plate 108 is deposited into mold cavity 114. Thereafter, the mold press is operated to compress the molding material into the desired shape. The shuttle plate 108 is then conveyed back laterally on the conveyor means 109 to the position shown in FIGS. 1 and 2 to receive a further preformed log or billet from the discharge end of preformer 88. The conveyor means 109 may be any type of conveyor, such as a roller or belt conveyor.

In FIG. 4 there is shown in a fragmentary, section view an alternative form of a preforming device. The preforming device as shown in FIG. 4 is generally indicated by reference numeral 120, and is shown as comprising an elongated accumulator/cylinder 122 within which a piston 124 is reciprocally mounted. A side port 128 is provided in cylinder 122 to receive adapter fitting 98 of the same shape and configuration as shown and described above with respect to the embodiment of FIGS. 1-3. A preform chamber 126 is provided between piston 124 and the discharge end of cylinder 122, as shown. Thus, the extrudate mixture of molten, fluid thermoplastic resin having discrete lengths of reinforcing fibers mixed therein is forced from the discharge end 8b of compounding extruder 8 by compounding screw 52 and through converging passage 100 of adapter fitting 98 and into preform chamber 126. Within chamber 126, the aforesaid extrudate is compressed against cut off knife 106 to form a preform molding charge of desired, cylindrical shape. Cut off knife 106 functions in the same way as described above with respect to FIGS. 1, 2, and 3 so as to cut off the preform to a desired length as piston 124 reciprocates back and forth. The forward movement of piston 124 discharges the preform when cut off knife 106 is raised, the knife then being moved downwardly to cut off the preform to the desired length.

In some instances, it may be desirable to form the extrudate of thermoplastic resin and reinforcing fibers from compounding extruder 8 into the shape of a sheet. Such a sheet product could be utilized for compression molding as a thermoplastic, sheet-molding compound (TP-SMC). In order to accomplish this, the preform device or equipment would comprise a pair of calendering rollers 130 and 132 which are spaced apart a predetermined distance to form a nip 134 to shape sheets of the desired thickness. The rotatably mounted rollers 130 and 132 are disposed adjacent to a special adapter fitting 136 affixed to the discharge end 8b of compounding extruder 8 as shown in FIG. 5. Adapter fitting 136 is actually a sheet-forming die and has an internal passage 138 converging at its outer end to the shape of a slot 139 of the desired length for forming sheets from the extrudate forced from the discharge end of compounding extruder 8 by power screw 52. A sheet formed in such a manner is indicated by reference numeral 140. A reciprocating cut off knife 142 is mounted as shown at the output side of nip 134 between rollers 130 and 132 to cut off the sheets to the desired length. A receiving table or plate 144 is positioned to receive the sheets 140, with the rear edge of the table serving as a guide for cut off knife 142.

Those skilled in the art will appreciate that particular advantages flow from the multiple extruder apparatus and method disclosed herein for compounding thermoplastic resin with relatively long reinforcing fibers (over one inch in length) so as to make a molding preform. In addition to the particular benefits discussed above with respect to the use of a separate thermoplastic resin extruder 4 in combination with a compounding extruder 8 into which the thermoplastic resin is introduced in a molten state for mixture with reinforcing fibers introduced through a separate port, the use of a separate, resin heating and melting extruder 4 in combination with the compounding extruder 8, with the screws of the two extruders being independently driven, permits the screw speeds of the two extruders to be controlled independently of one another. The speed of the compounding extruder screw 52 may well not be the same as the speed of the resin-melting extruder screw 12. The extruders 4 and 8 are also of different sizes with respect to their internal diameters and lengths so that at maximum output speeds, the extrudate from resin extruder 4, together with the added fiber introduced through port 62 into compounding extruder 8 will match the output rate of the compounding extruder 8.

The loss-in-weight scales 34 and 70, also known as gravimetric weight scales, ensure that thermoplastic resin pellets and chopped fibers are consistently and accurately supplied on a minute-to-minute basis over extended periods of time. The raw material feeding systems 6 and 10 are very important to the operation of the entire system so as to establish and maintain the proper blend of thermoplastic resin and reinforcing fibers. Once the extrudate has been formed from the compounding of the raw materials in compounding extruder 8, further blending of the extrudate is not possible.

The multiple extruder apparatus and method as disclosed herein brings particular operating efficiencies and cost savings to molding operations requiring a measured preform. The molder's raw material costs are significantly reduced, since he does not have to pay for the cost of precompounded pellets or sheet. The compounding takes place on the molding site as a continuous operation integral to the molding process. The system is also very flexible. The reinforcing fiber content can be varied as desired by the initial programming of the fiber feed system 10. Additives can be provided to the thermoplastic resin system prior to extrusion and various forms of reinforcement can be run alone or multiple reinforcements can be run to form a hybrid composite. This system also provides flexibility with respect to multiple sources of supply of reinforcing fiber materials. The molder can provide any particular fiber supply desired in fiber-supply packages 66, such as glass, carbon, etc. Hygroscopic resins can be easily handled and dried, utilizing the dryer 32 described above with respect to the resin supply system 6. Also, the system keeps total control of the process for compounding thermoplastic resin materials and reinforcing fibers and making the preform in the hands of the molder.

It is anticipated that various changes may be made in the arrangement and operation of the double-extruder system for compounding thermoplastic resin with reinforcing fibers, as well as in the size and shape of the preformer apparatus, without departing from the spirit and scope of the invention as defined by the following claims.

What is claimed is:

1. Apparatus for compounding reinforcing fibers with a thermoplastic resin comprising:
   a source of supply of thermoplastic resin pellets;
   a resin extruder having an inlet for receiving thermoplastic resin pellets from said source of supply, an outlet, an elongated, rotatable extruding screw extending between said inlet and said outlet;
   pellet handling means for conveying thermoplastic resin pellets from said source of supply thereof into said resin extruder inlet, whereby thermoplastic resin pellets are mechanically pumped by said resin extruder screw from said inlet to said outlet and are thereby heated and melted;
   a compounding extruder comprising a single, continuous, straight barrel and an elongated, rotatable, power screw extending continuously therein between an inlet end and a discharge end of said barrel, said barrel having first and second inlet ports on said inlet end communicating with said power screw, said second inlet port being continuously connected in fluid flow relation to said outlet of said resin extruder for receiving molten thermoplastic resin therefrom at a location along said elongated power screw downstream from said first inlet port, and between said first inlet port and said discharge end of said compounding extruder barrel, and said power screw having substantially continuous thread means of generally helical configuration;
   a converging, flow restricting passage at said discharge end of said barrel of substantially less diameter than the diameter of said barrel;
   a source of supply of discrete, predetermined lengths of reinforcing fibers connected to said first inlet port of said compounding extruder, and means for feeding said fibers into said first inlet port, whereby the fibers are heated and mechanically worked by said power screw of said compounding extruder before coming into mixing contact with molten, thermoplastic resin, and the fibers are continuously confined under pressure within said screw barrel by said thread means and advanced by said thread means of said power screw as a continuous mat past said second inlet port for thorough initial wetting by molten thermoplastic resin, and said fibers and said thermoplastic resin intermix in said power screw to form a homogeneous molten mass of thermoplastic resin having discrete, discontinuous lengths of reinforcing fibers randomly and homogeneously dispersed therein.

2. Apparatus as defined in claim 1 wherein:
   said thermoplastic resin pellet handling means comprises weighing and conveying apparatus positioned to receive thermoplastic resin pellets from said source of supply thereof and to feed thermoplastic resin pellets into said resin extruder inlet at a predetermined weight rate; and
   said means for feeding said fibers into said first inlet port of said compounding extruder comprises weighing apparatus on which fibers are received and weighed and conveying apparatus positioned adjacent to said weighing apparatus to feed discrete lengths of reinforcing fibers into said first inlet port of said compounding extruder at a predetermined weight rate.

3. Apparatus as defined in claim 2, wherein:
   said weighing apparatus for said thermoplastic resin pellets and said weighing apparatus for said reinforcing fibers each comprises a loss-in-weight feed scale.

4. Apparatus as defined in claim 2 wherein:
   said source of supply of reinforcing fibers comprises continuous lengths of fibers on supply means positioned on a feed scale to serve as a fiber source, and said means for feeding said fibers comprises a pair of feed rollers rotating at a predetermined speed and positioned adjacent to said supply means, and a movable cut-off knife, and a feeder hopper positioned in fiber-receiving relation to said feed rollers and having an outlet connected to said first inlet port of said compounding extruder, whereby said feed rollers pull continuous lengths of fibers from said supply means and said cut-off knife cuts the fibers to said predetermined lengths, with the cut fibers being received in said feeder hopper, from which they are conveyed into said first inlet port of said compounding extruder.

5. Apparatus as defined in claim 4, wherein:
   a computer is connected is signal-receiving relation with said weighing apparatus for said fibers and in signal generating and sending relation with said feed rollers, said computer being programmed to provide a predetermined input feed rate of fibers, and said computer providing signals to said feed rollers to adjust said predetermined speed thereof in response to signals received by said computer from said fiber-weighing apparatus indicating the weight of fibers being fed from said source of supply.

6. Apparatus as defined in claim 2 wherein:
   said pellet-handling means further comprises a dryer through which thermoplastic resin pellets are conveyed for drying prior to being introduced into said inlet of said resin extruder.

7. Apparatus as defined in claim 2 wherein:
   said weighing and conveying apparatus for said thermoplastic resin pellets comprises a conveyor supported on a feed scale for conveying thermoplastic resin pellets to said inlet of said resin extruder at a predetermined weight rate.

8. Apparatus as defined in claim 1 wherein:
   a preforming device for forming the extrudate from said compounding extruder into a predetermined size, weight and shape of preformed mass is directly positioned at said discharge end of said compounding extruder.

9. Apparatus as defined in claim 8 wherein:
said preforming device comprises a pair of rollers having an input side and an output side and defining a nip, said input side being a fluid-flow communication with said discharge end of said compounding extruder to receive extrudate therefrom, whereby the extrudate is formed as a sheet-shaped preform by passing through said nip between said rollers, and further including a cut-off means adjacent the output side of said pair of rollers to cut sheet preforms into desired lengths.

10. Apparatus as defined in claim 1 wherein:
said screw of said resin extruder and said power screw of said compounding extruder are of different sizes and have different volume flow capacities.

11. Apparatus as defined in claim 1 wherein:
separate, power-drive means are independently, drivingly connected to said screw of said resin extruder and to said power screw of said compounding extruder for driving said screw and said power screw at predetermined rotational speeds, whereby said screw of said resin extruder and said power screw of said compounding extruder can be independently driven and controlled.

12. Apparatus as defined in claim 1 wherein:
said second inlet port is at a location on said barrel such that at least one-half the overall length of said power screw extends between said second inlet port and said discharge end of said barrel.

13. Apparatus as defined in claim 8 wherein:
said preforming device comprises means for forming said extrudate from said compounding extruder into an elongated billet, said preforming device having a discharge end through which a measured volume of an elongated billet comprising a homogeneous mixture of thermoplastic resin and reinforcing fibers is discharged;

the apparatus further comprising a cut-off knife positioned for movement across said discharge end of said preforming device to cut said elongated billers to predetermined lengths suitable for reception in a compression molding machine; and a compression molding machine positioned adjacent to said preforming device; and shuttle plate means positioned immediately adjacent to said discharge end of said preforming device and reversibly movable between said preforming device and said compression molding machine to receive said elongated billets one at a time from said discharge end of said preforming device and deliver them to said compression molding machine.

* * * * *